United States Patent
Chen et al.

(10) Patent No.: US 10,116,237 B2
(45) Date of Patent: Oct. 30, 2018

(54) INVERTER DEVICE AND CONTROLLING METHOD THEREOF

(71) Applicant: Huang-Jen Chiu, New Taipei (TW)

(72) Inventors: John L Chen, New Taipei (TW);
Cheng-Yen Chou, Taipei (TW);
Ming-Cheng Chen, Taipei (TW);
Huang-Jen Chiu, New Taipei (TW);
Yao-Ching Hsieh, Kaohsiung (TW);
Jing-Yuan Lin, New Taipei (TW)

(73) Assignee: Huang-Jen Chiu, New Taipei (TW)

( * ) Notice: Subject to any disclaimer, the term of this patent is extended or adjusted under 35 U.S.C. 154(b) by 12 days.

(21) Appl. No.: 15/423,561

(22) Filed: Feb. 2, 2017

(65) Prior Publication Data
US 2017/0272005 A1    Sep. 21, 2017

(30) Foreign Application Priority Data
Mar. 16, 2016    (TW) ............................ 105108119 A (51) Int. Cl.
*H02M 7/5395* (2006.01)
*H02M 1/15* (2006.01)
*H02J 3/38* (2006.01)

(52) U.S. Cl.
CPC ........... *H02M 7/5395* (2013.01); *H02M 1/15* (2013.01); *H02J 3/385* (2013.01)

(58) Field of Classification Search
CPC ......... H02M 7/5395; H02M 1/15; H02J 3/385
USPC ............................ 363/132, 98, 56.02, 40–43
See application file for complete search history.

(56) References Cited

U.S. PATENT DOCUMENTS

| 5,625,539 | A * | 4/1997 | Nakata | H02M 7/4807 363/132 |
| 7,834,485 | B2 * | 11/2010 | Park | H02J 7/35 307/117 |
| 8,467,200 | B2 * | 6/2013 | Pan | H02M 3/337 363/21.02 |
| 8,587,267 | B2 * | 11/2013 | Suntio | H02M 3/1582 323/262 |
| 9,698,671 | B2 * | 7/2017 | Lin | H02M 1/4241 |
| 2007/0194759 | A1 * | 8/2007 | Shimizu | H02J 7/0016 320/166 |

(Continued)

OTHER PUBLICATIONS

STIC search report from EIC 2800 searcher Benjamin Martin dated Aug. 7, 2017.*

*Primary Examiner* — Timothy J Dole
*Assistant Examiner* — Htet Z Kyaw
(74) *Attorney, Agent, or Firm* — Li & Cai Intellectual Property (USA) Office (57) ABSTRACT

An inverter device comprises a first stage circuit, a second stage circuit and a control module. The first stage circuit comprises a first switch module and a charge-discharge module. The second stage circuit comprises a second switch module and a filter module. The control module outputs a first control signal for controlling the first switch module to turn on/off and a second control signal for controlling the second switch module to turn on/off. The control module obtains an input current from the first stage circuit, and adjusts the input current according to a predetermined current value. In addition, the control module obtains an output power from the AC output terminal, and adjusts the duty cycle of the first control signal according to the output power and a predetermined output power.

12 Claims, 5 Drawing Sheets

(56) References Cited

U.S. PATENT DOCUMENTS

| | | | | |
|---|---|---|---|---|
| 2010/0236612 A1* | 9/2010 | Khajehoddin | ............ | G05F 1/67 |
| | | | | 136/252 |
| 2011/0056533 A1* | 3/2011 | Kuan | ................ | H01L 31/02021 |
| | | | | 136/244 |
| 2011/0095741 A1* | 4/2011 | Huang | .................. | H02M 3/156 |
| | | | | 323/283 |
| 2012/0007576 A1* | 1/2012 | Suntio | .................. | H02M 3/1582 |
| | | | | 323/312 |
| 2012/0008356 A1* | 1/2012 | Suntio | .............. | H02M 3/33507 |
| | | | | 363/131 |
| 2013/0077362 A1* | 3/2013 | Kumar | ................ | H02M 1/4225 |
| | | | | 363/49 |
| 2014/0049998 A1* | 2/2014 | Casey | ................ | H02M 7/5395 |
| | | | | 363/97 |
| 2014/0152239 A1* | 6/2014 | Yao | ....................... | H02J 7/0081 |
| | | | | 320/107 |
| 2014/0334187 A1* | 11/2014 | Chen | ..................... | H02M 3/335 |
| | | | | 363/16 |
| 2014/0369090 A1* | 12/2014 | Ueki | ...................... | H02M 1/15 |
| | | | | 363/41 |
| 2015/0137606 A1* | 5/2015 | Adest | ...................... | H02J 3/385 |
| | | | | 307/77 |
| 2015/0236581 A1* | 8/2015 | Chen | .................. | H02M 1/4208 |
| | | | | 363/131 |
| 2017/0077836 A1* | 3/2017 | Ginart | .................. | H02M 7/797 |
| 2017/0133926 A1* | 5/2017 | Lin | ..................... | H02M 1/4241 |
| 2017/0255218 A1* | 9/2017 | Gazit | ........................ | G05F 3/08 |

* cited by examiner

INVERTER DEVICE AND CONTROLLING METHOD THEREOF

BACKGROUND

1. Technical Field

The present disclosure relates to an inverter device and a controlling method thereof, in particular, to an inverter device electrically connected to a DC power and a controlling method thereof.

2. Description of Related Art

As the environmental issues develop, green energy generating devices such as the solar power generating device, wind power generating device, hydro power generating device, and so on are extensively used in many places to promote the utility of green energy. An inverter device plays a critical role in the green energy generating devices because it can transform the DC power into the AC power.

However, the conventional inverter device needs a larger mounting space. For example, the inverter device of 2KVA has to transform the DC power into the AC power by a transformer, and it therefore occupies a space which may be the same as a cooler/small refrigerator, which reduces the available space. In addition, the inverter device may generate the ripple current of 120 Hz, which requires additional circuitry, which usually includes an extra-large capacitor to suppress, thus further increasing the volume of the inverter. Hence, the conventional inverter device needs to be used more advantageously.

SUMMARY

An exemplary embodiment of the present disclosure provides an inverter device which is used to promote the utility thereof by a first stage circuit and a second stage circuit, wherein the first and second stage circuits are flexibly operated in the high frequency switching mode.

According to one exemplary embodiment of the present disclosure, an inverter device is provided. The inverter device is electrically connected to a DC power, and comprises a first stage circuit, a second stage circuit and a control module. The first stage circuit is electrically connected to the DC power, and comprises a first switch module and a charge-discharge module, wherein the first switch module is electrically connected to the charge-discharge module. The second stage circuit is electrically connected to the first stage circuit and an AC output terminal, and comprises a second switch module and a filter module, wherein the second switch module is electrically connected to the filter module. The control module is electrically connected to the first switch module and the second switch module, and outputs a first control signal for controlling the first switch module to turn on/off and a second control signal for controlling the second switch module to turn on/off. The control module obtains an input current from the first stage circuit, and adjusts the input current according to a predetermined current value. In addition, the control module obtains an output power from the AC output terminal, and adjusts the duty cycle of the first control signal according to the output power and a predetermined output power.

According to the other exemplary embodiment of the present disclosure, a method of controlling an inverter device is provided. The inverter device comprises a first stage circuit, a second stage circuit and a control module. The first stage circuit is electrically connected to a DC power and the second stage circuit. The second stage circuit is electrically connected to the first stage circuit and an AC output terminal. The control module is electrically connected to the first stage circuit and the second stage circuit. The first stage circuit comprises a first switch module and a charge-discharge module. The first switch module is electrically connected to the charge-discharge module. The second stage circuit comprises a second stage switch module and a filter module. The second switch module is electrically connected to the filter module. The method of controlling an inverter device comprises the following steps: the control module obtaining the input current from the first stage circuit and adjusting the input current according to a predetermined current value; and the control module obtaining the output power from the AC output terminal and adjusting the duty cycle of the first control signal according to a predetermined output power and the output power.

To sum up, the inverter device provided by the present disclosure can eliminate the ripple current generated by the second stage circuit through the first stage circuit. The control module controls the power of the charge-discharge module which flows into the first stage circuit according to the output power. In addition, the control module obtains a voltage of the charge-discharge module and adjusts the predetermined current value according to the obtained voltage so as to enable the input current to approximate to the predetermined current value, thereby controlling the magnitude of the capacitive current which flows into the charge-discharge module. In addition, the present disclosure applies a smaller capacitor to avoid the ripple current of 120 Hz, thereby reducing the size of the inverter device so as to promote the utility.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

Figure 1:
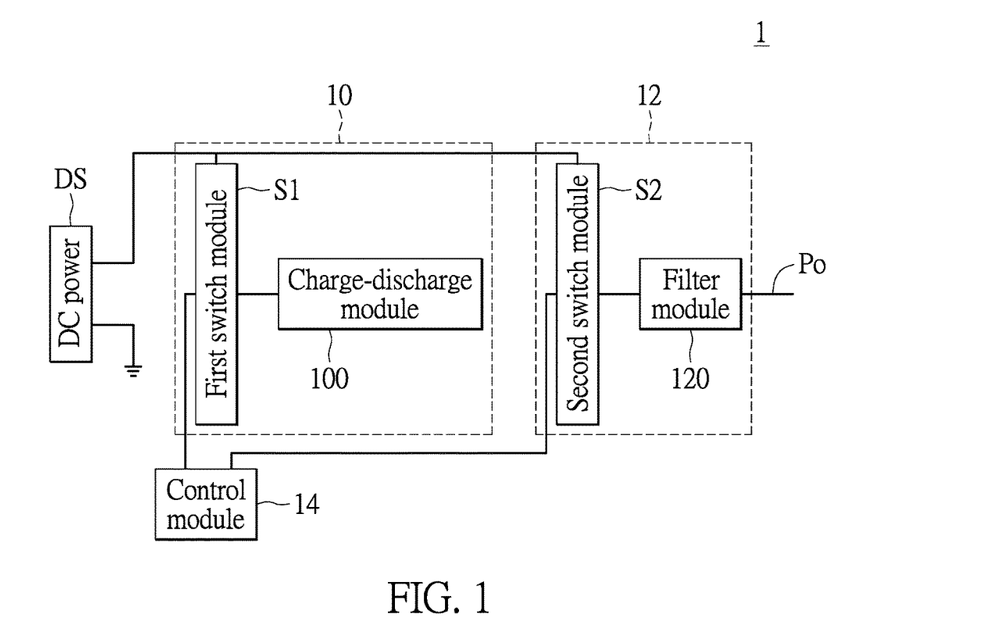
FIG. 1 is a block diagram of one embodiment of the circuit of the inverter device according to the present disclosure.

Please refer to FIG. 1, which is the circuit of one embodiment of the inverter device according to the present disclosure. An inverter device 1 is electrically connected to a DC power DS, and includes a first stage circuit 10, a second stage circuit 12 and a control module 14. Here, the DC power DS may be solar power, wind power, water power, or other DC power sources, but it is not limited thereto. The DC power may be the direct current of 450V, but it is not limited thereto. The inverter device 1 may be a current converter or an inverter of 2KVA used to transform the DC power DS into AC power. The inverter device 1 has a power intensity of over 50 W/in$^3$, but it is not limited thereto.

The first stage circuit 10 is electrically connected to the DC power DS, and includes a first switch module S1 and a charge-discharge module 100. The first switch module S1, which may be a DC-DC transformation circuit, is electrically connected to the charge-discharge module 100. The DC-DC conversion circuit may be a buck circuit, a boost circuit or a buck-boost circuit, that is, the first stage circuit 10 may be a buck circuit, a boost circuit or a buck-boost circuit, but it is not limited thereto.

The first switch module S1 may include one or more power transistors, gate transistors or field-effect transistors. The first switch module S1 is controlled by the control signal or the pulse width modulation signal outputted by the control module 14. The charge-discharge module 100 may include one or more inductors and capacitors. In the present embodiment, the input current of the input terminal of the first stage circuit 10 is used to control whether to turn on/off the first switch module S1, thereby controlling the current volume which flows into the charge-discharge module 100. However, the first switch module S1 and the charge-discharge module 100 are not limited thereto.

The second stage circuit 12 is electrically connected to the first stage circuit 10 and an AC output terminal Po, and includes a second switch module S2 and a filter module 120. The second switch module S2, which may be a DC-AC transformation circuit, is electrically connected to the filter module 120. Here, the DC-AC transformation circuit may be a bridge inverter circuit, and the bridge inverter circuit may be a full-bridge or a half-bridge inverter circuit, but the second switch module S2 is not limited thereto.

The second switch module S2 may include one or more power transistors, gate transistors or field-effect transistors. The filter module 120 may be a LCL, a LLC or a LCC circuit which includes at least one inductor and at least one capacitor. The second switch module S2 is controlled by the control signal or the pulse width modulation signal outputted by the control module 14, thereby controlling the inverted output and communication of the second stage circuit 12. However, the second switch module S2 and the filter module 120 are not limited thereto.

The control module 14 is electrically connected to the first switch module S1 and the second switch module S2, and outputs a first control signal for controlling the first switch module S1 to turn on/off and a second control signal for controlling the second module S2 to turn on/off. The control module 14 may be a CPU, a MCU or a digital signal processor used to calculate and execute the signals of the inverter device 1, but it is not limited thereto.

Specifically, the control module 14 controls the first switch module S1 and the second switch module S2 to operate in the high frequency switching mode and the zero voltage switching mode, that is, the first switch module S1 and the second switch module S2 can be flexibly operated and switched. Thus the present disclosure outputs the same power but without using a transformer needing electrical isolation. In addition, the present disclosure can be formed in the same volume as a tablet computer.

The control module 14 obtains an input current from the first stage circuit 10, and adjusts the obtained input current according to a predetermined current value. In addition, the control module 14 obtains an output power from the AC output terminal Po, and adjusts a duty cycle of the first control signal according to the output power and a predetermined output power.

When the output power is greater than the predetermined output power, the control module 14 increases the duty cycle of the first control signal. When the output power is smaller than the predetermined output power, the control module 14 decreases the duty cycle of the first control signal. That is, the control module 14 adjusts the duty cycle to increase or decrease the input current which flows into the charge-discharge module 100.

For example, when the output power is greater than the predetermined output power, the control module 14 controls the first switch module S1 according to a higher duty cycle (such as 90%) to increase the current which flows into the charge-discharge module 100. When the output power is smaller than the predetermined output power, the control module 14 controls the first switch module S1 according to a lower duty cycle (such as 70%) to decrease the current which flows into the charge-discharge module 100.

When the second stage circuit 12 is incapable of drawing the input current completely, the first stage circuit 10 helps to draw the input current, so the input current flows into the charge-discharge module 100 through the first switch module S1. When the second stage circuit 12 needs to draw more current, the first stage circuit 10 supplies current to the second stage circuit 12 by the charge-discharge module 100.

It should be noted that if solar power is used to determine a magnitude of input current, the effective accumulative insolation plays a critical factor. For example, the greater insolation of sunlight can generate the greater input current to the first stage circuit 10. Here, the predetermined current value is the reference value of the predetermined input current, that is, the target value the input current of the present embodiment wants to achieve.

Figure 4:
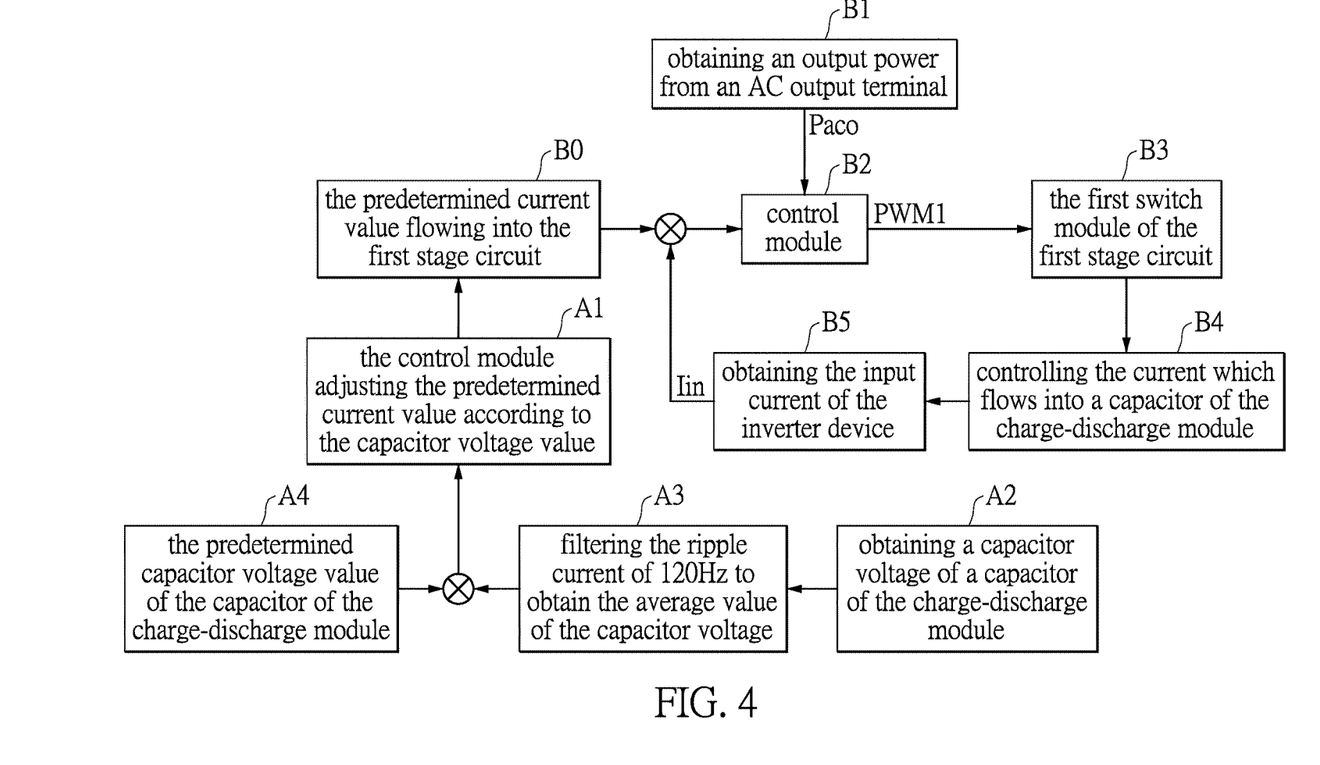
FIG. 4 is a flowchart illustrating how the inverter device of the present disclosure is operated.

The inverter device 1 has two operation modes which are the grid connected and the off-grid mode. In the grid connected mode, the predetermined current value is generated by a Maximum Power Point Tracker (MPPT). The present disclosure can work together with the MPPT. For example, the MPPT has a predetermined current value, and the inverter device 1 of the present embodiment is operated according to the predetermined current value. In the off-grid mode, the predetermined current value is determined by the output power such as the predetermined current value introduced by the output power and the voltage of the charge-discharge module 100 as shown in FIG. 4, wherein the predetermined current value is the target input current value. In addition, the MPPT can be integrated with the control module 14. Persons with the ordinary skill in the art can determine the predetermined current value.

In addition, the control module 14 adjusts the predetermined current value according to the average voltage of the charge-discharge module 100. In practice, the inflow of the input current is affected by the status of the charge-discharge module 100. For example, when the charge-discharge module 100 is in the full charge mode, the input current cannot flow into the charge-discharge module 100. So, in the present embodiment, the voltage of the charge-discharge module 100 is used to control the current volume of the input current which flows into the charge-discharge module 100, thereby controlling the voltage of the charge-discharge module 100 to not fluctuate above the saturation voltage (the upper limit value) or below zero voltage (the lower limit value).

Figure 2:
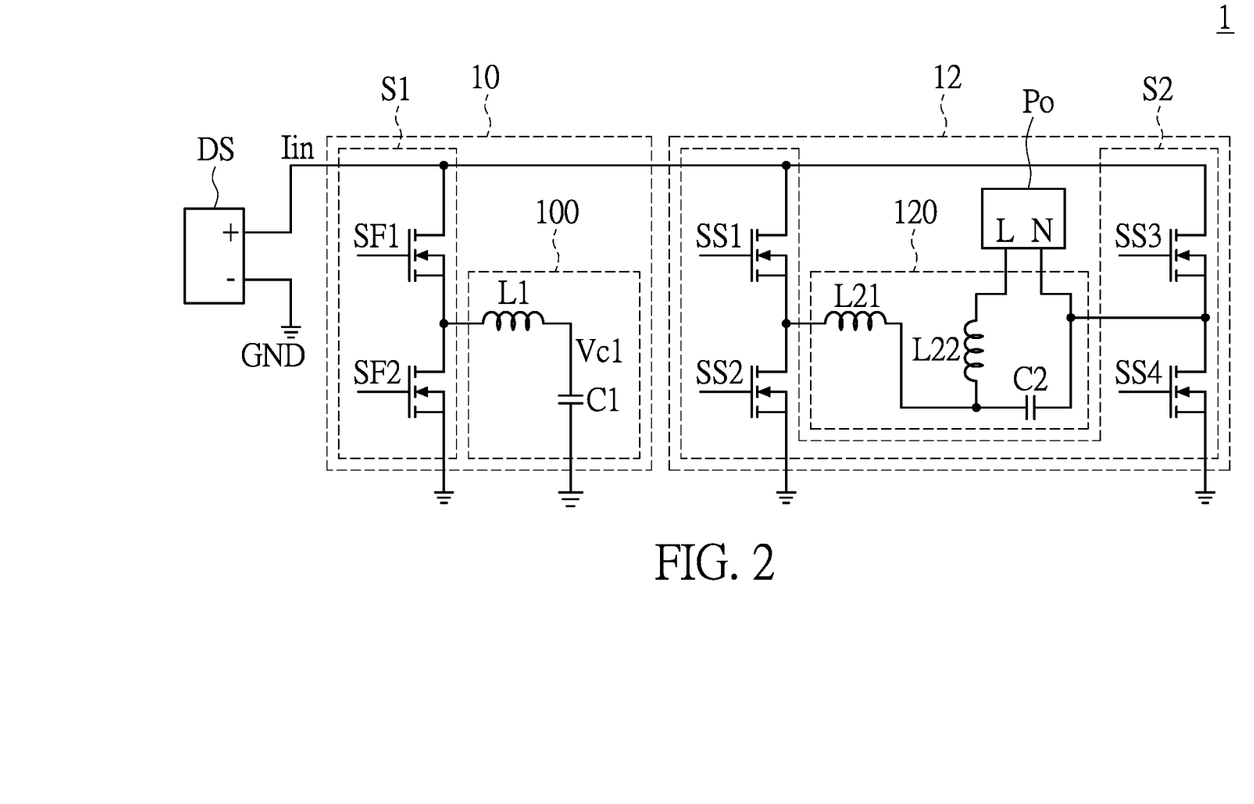
FIG. 2 is a block diagram of the other embodiment of the circuit of the inverter device according to the present disclosure.

Please refer to FIG. 2, which is a block diagram of another embodiment of the circuit of the inverter device according to the present disclosure. For better understanding, the first stage circuit 10 of the present embodiment is configured to be a buck converter topology which can be operated in the bilateral switching mode, and the second stage circuit 12 is configured to be a full bridge circuit, but the present disclosure is not limited thereto.

As shown in FIG. 2, the charge-discharge module 100 includes an inductor L1 and a capacitor C1. The inductor L1 is electrically connected between the first switch module S1 and the capacitor C1. The capacitor C1 is electrically connected between the inductor L1 and a grounding terminal. The filter module 120 is an LCL circuit including the inductors L21, L22 and a capacitor C2. Here, the inductor L21 is electrically connected between the switches SS1, SS2 of the second switch module S2 and the inductor L22 and the capacitor C2. The capacitor C2 is electrically connected between the inductors L21, L22 and the switches SS3, SS4 of the second switch module S2 and the AC output terminal Po, but the charge-discharge module 100 and the filter module 120 of the present embodiment are not limited thereto.

In the present embodiment, the first stage circuit 10 is used to eliminate the ripple current generated by the second stage circuit 12 because the DC side of the conventional inverter usually generates a ripple current of 120 Hz. For example, the switch SF1 of the first switch module S1 is turned on to introduce the input current Iin into the capacitor C1, or the power source stored in the capacitor C1 is introduced into the second stage circuit 12 by the switch SF1, thereby eliminating the ripple current of 120 Hz. That is, the charging and discharging of the capacitor C1 can block the ripple current of 120 Hz.

Specifically, the predetermined output power is the average output power calculated by the control module 14. The output power minus the average output power is equal to the ripple of the power. Thus, when the control module 14 obtains the ripple of the power, the control module 14 controls the power which flows into the capacitor C according to the ripple of the power. That is, when the power which flows into the capacitor C1 is controlled to be equal to the ripple of the power, the first stage circuit 10 can block the ripple current of 120 Hz.

The first stage circuit 10 is used to block the ripple current which flows form the second stage circuit 12 to the first stage circuit 10. The control module 14 adjusts the duty cycle of the first switch module S1 according to the output power and the predetermined output power. In addition, the control module 14 adjusts the predetermined current value according to the capacitor voltage Vc1 to enable to the output current Iin to approximate to the predetermined current value, thereby controlling the current of the capacitor C1 which flows into the charge-discharge module 100. That is, in the present embodiment, the magnitude of the input current Iin is determined by the capacitor voltage Vc1, thereby enabling the input current Iin to approximate to the predetermined current value.

It is worth mentioning that the conventional inverter may use a bigger capacitor to passively eliminate the ripple current of 120 Hz, wherein the passive capacitor might have the same volume as a coffee cup, which would reduce the space available for the inverter circuit. However, the present embodiment uses the multi-layer ceramic capacitor (MLCC) which has a smaller volume to block the ripple current of 120 Hz, thereby reducing the entire volume of the inverter device 1.

The inductor L21 of the second stage circuit 12 has an inductance value that is smaller than an inductance value of the inductor L22. The control module 14 switches the switches SS1, SS2 of the second switch module S2 and the switches SS3, SS4 of the second switch module S2 to perform the communication by a high frequency switching mode. The AC output terminal Po may be the AC power of 240V, 60 Hz. The inductor L21 of the second stage circuit 12 has a smaller inductance value and is electrically connected between the switches SS1 and SS2 of the second switch module S2 that is operated in the high frequency switching mode, thereby reducing the entire volume to be the same as a tablet computer.

It is worth mentioning that the drain and source electrodes of the switches SS1, SS2 of the second switch module S2 can be connected in parallel with the Schottky diode (not shown) or a parasitic capacitor (not shown) therebetween. The parallel Schottky diode introduces additional capacitance to the existing output parasitic capacitance of the switching transistor. This additional capacitance can help by slowing down the rate of change of voltage across the drain and the source during the turnoff of the switching transistor. Thus, during the turnoff, the gate can fully switch off, cutting off the current, before the drain-source voltage can rise enough to cause substantial switching loss, thus enabling the switching circuitry to operate in a soft-switching fashion.

Figure 3:
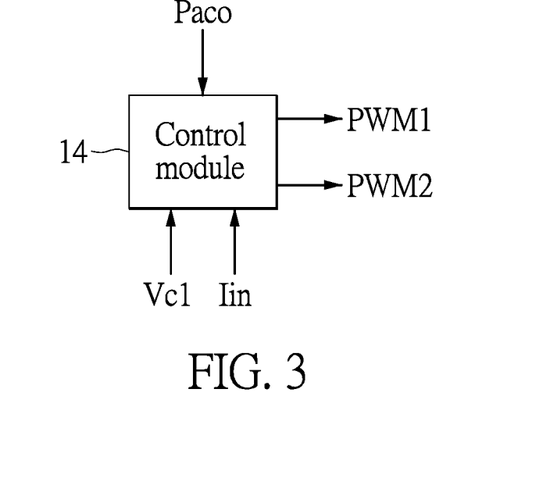
FIG. 3 is a schematic diagram of the control module of the inverter device according to the present disclosure.

Please refer to FIG. 3, which is a schematic diagram of the control module of the inverter device according to the present disclosure. The control module 14 shown in FIG. 3 controls the first switch module to turn on/off by the first control signal PWM1, and controls the second switch module to turn on/off by the second control signal PWM2. That is, the control module 14 respectively controls the first switch module and the second switch module to turn on/off. Here, the first PMW1 and the second PMWs control signals are the pulse width modulated signals.

The control module 14 obtains the input current Iin, the output power Paco and the capacitor voltage Vc1, wherein the output power Paco is outputted by the AC output terminal. The input current Iin is inputted to the input terminal between the DC power and the first stage circuit. The capacitor voltage Vc1 is obtained by measuring the capacitor voltage of the charge-discharge module 100. For example, the control module 14 turns on the switch of the first switch module to enable the input current Iin to flow into the capacitor, thereby charging the capacitor, or the control module 14 turns on the switch of the first switch module to enable the power source stored in the capacitor to flow into the second stage circuit through the switch of the first switch module.

Please refer to FIG. 4, which is a flowchart illustrating how the inverter device of the present disclosure is operated. For better understanding, B0-B5 are used as the first feedback loop, and A1-A4 are used as the second feedback loop. The first loop determines the duty cycle of the first switch module of the first stage circuit by measuring the output power Paco, and the first stage circuit buffers the power and blocks the ripple current of 120 Hz. The second feedback loop determines the magnitude of the input current Iin by measuring the capacitor voltage Vc1, thereby enabling the input current Iin to approximate to the predetermined current value.

In block B0, it shows the predetermined current value flowing into the first stage circuit. In block B5, it shows obtaining the input current Iin of the inverter device. After that, the predetermined current value in block B0 is compared with the input current Iin in block B5, and then the comparison result is outputted to the control module 14 in B2, so that the control module 14 adjusts the input current Iin according to the predetermined current value, thereby enabling the input current Iin to approximate to the predetermined current value.

In other words, the control module 14 adjusts the magnitude of the input current Iin according to the difference value between the input current Iin and the predetermined current value. When the input current Iin is greater than the predetermined current value, the control module 14 decreases the input current Iin. When the input current Iin is smaller than the predetermined current value, the control module 14 increases the input current Iin.

Block B1 shows obtaining the output power Paco outputted by the AC output terminal. In block B2, the control module 14 adjusts the duty cycle of the first control signal PWM1 according to the difference value between the output power Paco and the predetermined output power, and then outputs the adjusted duty cycle of the first control signal PWM1 to the first switch module of the first stage circuit in block B3. Finally, as shown in block B4, controlling the capacitive current which flows into the discharge-discharge module.

For example, the predetermined output power is the average output power calculated by the control module 14, and the output power Paco minus the average output power is equal to the ripple of the power. Thus the control module 14 obtains the ripple of the power, and controls the power of the capacitor which flows into the discharge-discharge module according to the ripple of the power. That is, when the power of the capacitor which flows into the discharge-discharge module is controlled to be equal to the ripple of the power, the first stage circuit can block the ripple current of 120 Hz.

The control module 14 controls the first switch module of the first stage circuit to switch, thereby determining the current which flows into the capacitor. According to the law of conservation of energy, when the voltage is a constant value, it also determines a magnitude of input current Iin which is to be drawn. That is, in the present embodiment, the magnitude of input current Iin is used as the reverse conversion and the reverse conversion is used to the output power Paco applied to the feedback control. Thus, the target magnitude of the input current Iin leads the input current Iin to approximate to the target current.

In block A2, it shows obtaining a capacitor voltage Vc1 of a capacitor of the charge-discharge module. In block A3, it shows filtering the ripple current of 120 Hz to obtain the average value of the capacitor voltage Vc1. In practice, the capacitor voltage Vc1 is measured to ensure that the voltage fluctuation is not over the upper limit value or below the lower limit value. That is, the capacitor voltage Vc1 is not operated in the empty status or saturation status. If the input current Iin is too high, the input current Iin is decreased, and if the input current Iin is too low, the input current is increased, so that the second feedback loop thereby determines the input current Iin.

The predetermined capacitor voltage of the capacitor of the charger-discharge module is shown in block A4. In practice, the capacitor voltage Vc1 is not operated in the empty status or saturation status. Thus the predetermined capacitor voltage is the reference value or interval value of the capacitor voltage Vc1. In block A1, it shows the control module 14 adjusting the predetermined current value according to the capacitor voltage Vc1. Persons with the ordinary skill in the art can determine the predetermined capacitor voltage value.

It is worth mentioning that the first PWM1 and second PWM2 control signals are the pulse width modulated signals. The dead-time of the pulse width modulated signal is the key to achieve the zero voltage switching mode. For example, the first PWM1 and second PWM2 control signals outputted by the control module 14 must have the correct dead-time to avoid breaking the switches or other components. However, the dead-time may change under different operation conditions such as cycle times, output currents, input currents, and so on. In the present embodiment, a list of dead-time for various operating conditions is pre-calculated beforehand, and stored within control module 14, thus during the operation, the control module 14 can look up the list for an entry matching the current operating condition and uses the pre-calculated dead-time. In other embodiments, the dead-time can be produced by other methods, and it is not limited thereto.

Figure 5:
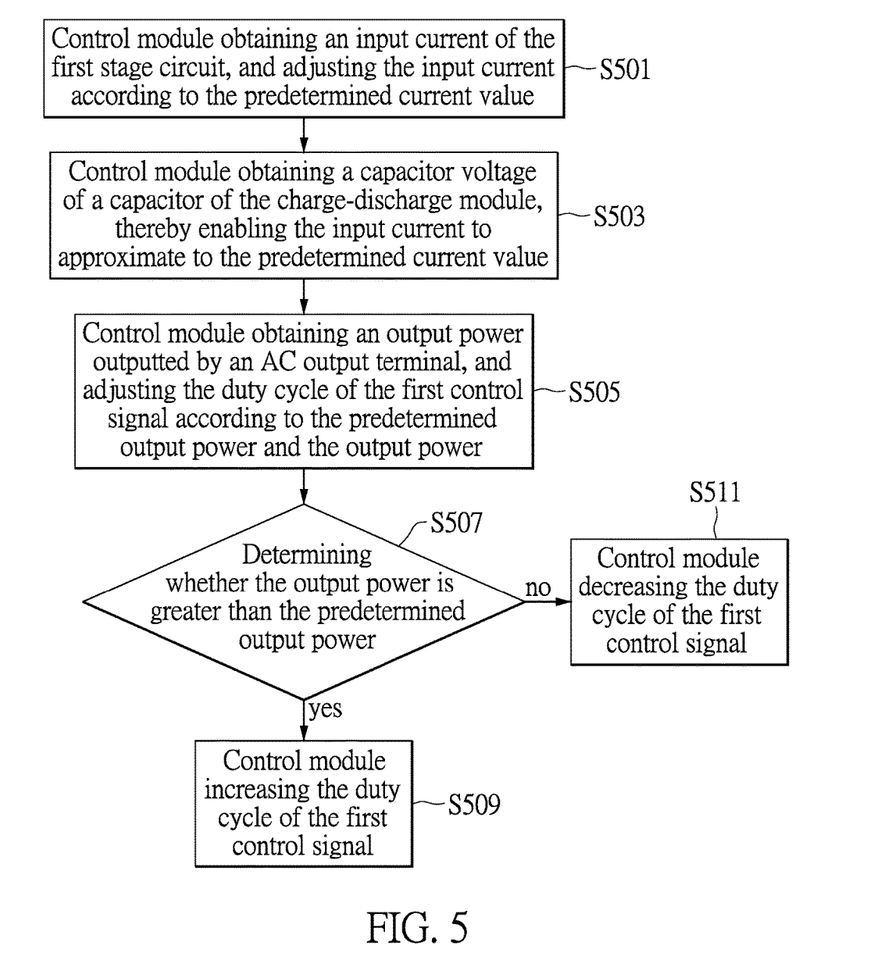
FIG. 5 is a flowchart of the method of controlling the inverter device of the present disclosure.

Please refer to FIG. 5, which is a flowchart of the method of controlling the inverter device of the present disclosure. The inverter device includes a first stage circuit, a second stage circuit and a control module. The first stage circuit is electrically connected to a DC power and the second stage circuit. The second stage circuit is connected to the first stage circuit and an AC output terminal. The control module is electrically connected to the first stage circuit and the second stage circuit. The first stage circuit includes a first switch module and a charge-discharge module. The first switch module is electrically connected to the charge-discharge module. The second stage circuit includes a second switch module and a filter module. The second switch module is electrically connected to the filter module. The method of controlling an inverter device includes the following steps:

S501: the control module obtaining an input current of the first stage circuit, and adjusting the input current according to a predetermined current value. In practice, the input current flows from the first stage circuit into the second stage circuit, and is used as the input at the DC side of the second stage circuit, wherein the input at the DC side will affect the output at the AC side of the second stage circuit. Thus the control module adjusts the input current according to the predetermined current value, thereby adjusting the output power of the second stage circuit after the reverse conversion.

S503: the control module obtaining a capacitor voltage of a capacitor of the charge-discharge module, thereby enabling the input current to approximate to the predetermined current value. In practice, the energy status of the capacitor will affect the magnitude of the input current which flows into the capacitor. Thus the control module adjusts the predetermined current value according to the capacitor voltage, thereby enabling the input current to approximate to the predetermined current value, so as to control the magnitude of the capacitive current which flows into the charge-discharge module.

S505: the control module obtaining an output power outputted by an AC output terminal, and adjusting the duty cycle of the first control signal according to the predetermined output power and the output power. In practice, the first stage circuit may be in a form of buck converter topology. Here, increasing the duty cycle of the first control signal will boost the capacitor voltage, that is, electric current will flow into the capacitor. When the duty cycle of the first control signal is decreased, the capacitor voltage decreases accordingly, that is, the quantity of electric charge of the input current which flows into the capacitor decreases.

In S507: determining whether the output power is greater than the predetermined output power. If the output power is determined to be greater than the predetermined output power, it enters S509. In S509, the control module increases the duty cycle of the first control signal. If the output power is determined to be smaller than the predetermined output power, it enters S511. In S511, the control module decreases the duty cycle of the first control signal. In other words, when the output power is greater than the predetermined output power, the control module increases the duty cycle of the first control signal. When the output power is smaller than the predetermined output power, the control module decreases the duty cycle of the first control signal.

That is to say, the increased or decreased value of the duty cycle of the first control signal in S509 and S511 is associated with the error values of the output power and the predetermined output power in S507. Specifically, in S507, S509 and S511, the predetermined output power subtracts the output power, and the result is operated on by the linear transfer function, and the choice of linear transfer function does not limit the present disclosure. The linear transfer function may be the power compensation function of the control module which is similar to the compensation function of a low-pass filter. After the saturation, the result obtained from the linear transfer function is used as the duty cycle. Here, the saturation indicates the upper limit and the lower limit in the saturation region of hardware components of the physical circuit. Persons with the ordinary skill in the art can determine the upper limit and the lower limit of the saturation.

As shown in FIG. 5, in the stable operation condition, the control module adjusts the duty cycle of the first control signal. In the transient state, S507, S509 and S511 shown in FIG. 5 are executed according to the above-mentioned method. Basically, the increased or decreased value of the duty cycle of the first control signal in S509 and S511 is associated with the error values of the output power and the predetermined output power in S507. Persons with the ordinary skill in the art can determine the duty cycle. The method provided by the present embodiment can be feasibly applied to the inverter device shown in FIGS. 1-4, but it is not limited thereto.

In summary, the present disclosure provides an inverter device to block the ripple current generated by the second stage circuit from flowing to the first stage circuit. The control module calculates the ripple of the power according to the output power, thereby controlling the power of the capacitor which flows into the first stage circuit. That is, when the control module controls the power which flows into the capacitor to be equal to the ripple of the power, the first stage circuit can block the ripple current, which flows from the second stage circuit to the first stage circuit. In addition, the control module obtains a capacitor voltage of the capacitor of the charge-discharge module, and adjusts the predetermined current value according to the capacitor voltage, thereby enabling the input current to approximate to the predetermined current value. The inductance of the second stage circuit has a smaller inductance value and is electrically connected to the second switch module which is operated in the high frequency switching mode, thereby achieving the flexible switching and reducing the entire volume of the inverter device to be the same as a tablet computer. Thus the present disclosure promotes the utility of the inverter device.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An inverter device electrically connected to a direct current source, comprising:
   a first stage circuit electrically connected to the direct current source and comprising a first switch module and a charge-discharge module, wherein the first switch module is electrically connected to the charge-discharge module;
   a second stage circuit electrically connected to the first stage circuit and an AC output terminal and comprising a second switch module and a filter module, wherein the second switch module is electrically connected to the filter module; and
   a control module electrically connected to the first switch module and the second switch module, and outputting a first control signal for controlling the first switch module to turn on/off and a second control signal for controlling the second switch module to turn on/off;
   wherein the control module obtains an input current from the first stage circuit, the control module determines a predetermined current value with a varied capacitor voltage of a capacitor included in the charge-discharge module and adjusts the input current to be approaching to the predetermined current value, and the control module obtains an output power from the AC output terminal and adjusts the duty cycle of the first control signal according to the output power and a predetermined output power.

2. The inverter device according to claim 1, wherein the control module increases the duty cycle of the first control signal when the output power is greater than the predetermined output power, and decreases the duty cycle of the first control signal when the output power is smaller than the predetermined output power.

3. The inverter device according to claim 2, wherein the control module controls the first switch module to operate in a high frequency switching mode and a zero voltage switching mode and controls the second switch module to operate in the high frequency switching mode and the zero voltage switching mode, and a Schottky diode or a parasitic capacitor is connected in parallel between the drain and source electrodes of each switch of the second switch module.

4. The inverter device according to claim 1, wherein the charge-discharge module is an inductor and a capacitor, the inductor is electrically connected to the first switch module and the capacitor, and the capacitor is electrically connected to the inductor and a grounding terminal.

5. The inverter device according to claim 4, wherein the control module controls the first switch module to operate in a high frequency switching mode and a zero voltage switching mode and controls the second switch module to operate in the high frequency switching mode and the zero voltage switching mode, and a Schottky diode or a parasitic capacitor is connected in parallel between the drain and source electrodes of each switch of the second switch module.

6. The inverter device according to claim 1, wherein the first stage circuit is a DC-DC transformation circuit, the second stage circuit is a DC-AC transformation circuit, the DC-DC transformation circuit is a buck circuit, a boost circuit or a buck-boost circuit, and the DC-AC transformation circuit is a bridge inverter circuit.

7. The inverter device according to claim 6, wherein the control module controls the first switch module to operate in a high frequency switching mode and a zero voltage switching mode and controls the second switch module to operate in the high frequency switching mode and the zero voltage switching mode, and a Schottky diode or a parasitic capacitor is connected in parallel between the drain and source electrodes of each switch of the second switch module.

8. The inverter device according to claim 1, wherein the first stage circuit blocks the ripple current which flows from the second stage circuit to the first stage circuit.

9. The inverter device according to claim 8, wherein the control module controls the first switch module to operate in a high frequency switching mode and a zero voltage switching mode and controls the second switch module to operate in the high frequency switching mode and the zero voltage switching mode, and a Schottky diode or a parasitic capacitor is connected in parallel between the drain and source electrodes of each switch of the second switch module.

10. The inverter device according to claim 1, wherein the control module controls the first switch module to operate in a high frequency switching mode and a zero voltage switching mode and controls the second switch module to operate in the high frequency switching mode and the zero voltage switching mode, and a Schottky diode or a parasitic capacitor is connected in parallel between the drain and source electrodes of each switch of the second switch module.

11. A method of controlling an inverter device, wherein the inverter device comprises: a first stage circuit, a second stage circuit and a control module; the first stage circuit electrically connected to a DC power and the second stage circuit, the second stage circuit electrically connected to the first stage circuit and an AC output terminal; the control module electrically connected to the first stage circuit and the second stage circuit; wherein the first stage circuit comprises a first switch module and a charge-discharge module, the first switch module is electrically connected to the charge-discharge module, the second stage circuit comprises a second switch module and a filter module, the second switch module is electrically connected to the filter module, wherein the method comprises the following steps:

the control module obtaining an input current which flows into the first stage circuit, the control module determining a predetermined current value with a varied capacitor voltage of a capacitor included in the charge-discharge module and adjusting the input current to be approaching to the predetermined current value, and the control module obtaining an output power from the AC output terminal, and adjusting the duty cycle of the first control signal according to a predetermined output power and the output power.

12. The method according to claim 11, wherein in the step of the control module adjusting the duty cycle of the first control signal according to the predetermined output power and the output power further comprises the step of:

the control module increasing the duty cycle of the first control signal when the output power is greater than the predetermined output power; and the control module decreasing the duty cycle of the first control signal when the output power is smaller than the predetermined output power.

* * * * *